United States Patent [19]

Ghazarian

[11] Patent Number: 4,906,969
[45] Date of Patent: Mar. 6, 1990

[54] METHOD AND SYSTEM FOR PROTECTING AUTOMOTIVE APPLIANCES AGAINST THEFT

[76] Inventor: John Ghazarian, 14614 Burbank Blvd., Apt. 114, Van Nuys, Calif. 91411

[21] Appl. No.: 306,464

[22] Filed: Feb. 6, 1989

[51] Int. Cl.⁴ .............................................. G08B 13/14
[52] U.S. Cl. ..................................... 340/426; 340/457; 340/568; 340/687
[58] Field of Search ............... 340/457, 426, 572, 568, 340/686, 687

[56] References Cited

U.S. PATENT DOCUMENTS

| | | | |
|---|---|---|---|
| 4,427,967 | 1/1984 | Maiocco | 340/457 |
| 4,679,026 | 7/1987 | Knarowski et al. | 340/426 |
| 4,758,817 | 7/1988 | Akiyama | 307/10.2 |
| 4,805,233 | 2/1989 | Robitschko et al. | 340/426 |

Primary Examiner—Joseph A. Orsino
Assistant Examiner—Frank M. Scutch, III
Attorney, Agent, or Firm—William E. Mouzavires

[57] ABSTRACT

A system for use in an automobile to indicate that the user has failed to remove an appliance, such as a radio, when the ignition switch is turned off. The system includes a circuit including an audible or visual alarm, the automobile battery for powering the circuit, a relay connected between the battery and the alarm, the automobile ignition switch for controlling the relay, and a switch controlled by insertion or removal of the appliance from its compartment located, for example, in the dashboard of the automobile. When the appliance is inserted in its compartment with the ignition switch off, the alarm will be energized until the ignition switch is turned on. If the ignition switch is subsequently turned off while the appliance is still in its compartment, the alarm will again be energized, thus indicating that the appliance should be removed before leaving the automobile. Removal of the appliance will terminate the signal.

20 Claims, 3 Drawing Sheets

CIRCUIT DIAGRAM WITH BEEPER ALERT

CIRCUIT DIAGRAM WITH L.E.D.

METHOD AND SYSTEM FOR PROTECTING AUTOMOTIVE APPLIANCES AGAINST THEFT

BACKGROUND OF INVENTION

The automobile of today may be equipped with one or more appliances such as a radio, telephone, VCR, facsimile machine, television, cassette player, computer, etc. These items are relatively expensive making them prime targets for theft. Unfortunately, theft of such items from automobiles has reached such alarming levels that there now exists an urgent need for an effective method of protecting these items against theft.

One known method of guarding such appliances against theft attempts to conceal the appliances from view. However, it is believed that the effectiveness of this method will be of limited duration since it will only be a matter of time when concealment of the appliance will become a matter of general knowledge.

OBJECTS OF THE PRESENT INVENTION

It is an object of the present invention to provide a novel method and system for preventing theft from automobiles, trucks, vans or other vehicles, of appliances such as radios, cassette players, television sets, telephones, VCR's facsimile machines, computers and other similar appliances.

Another object of the present invention is to provide such a method and system which may be incorporated in new or used automobiles or other vehicles without any substantial modification of the automobile or appliance to be protected and yet will be highly effective to prevent theft of the appliance. Included herein is such a method and system which will be relatively simple and inexpensive to apply to the appliance and the automobile.

A further object of the present invention is to provide a method and system for use in an automotive vehicle to signal to the vehicle operator to remove an appliance from the vehicle before leaving the vehicle. Included herein is such a method and system which may utilize, in operation, standard automotive components such as the battery and ignition switch.

A still further object of the present invention is to provide a novel electrical circuit for signaling to the operator of an automotive vehicle to remove an appliance from the vehicle before leaving the vehicle. Another object included herein is such a circuit which incorporates parts that are commercially available on the market and which will be practical to implement such that the system of the invention may be made readily available to the consumer.

SUMMARY OF INVENTION

The preferred embodiment of the present invention includes an electric circuit including an audible and/or visual alarm and the ignition switch of an automotive vehicle for producing an alarm signalling to the operator to remove the appliance from the vehicle after the ignition switch has been turned off. The circuit also includes a switch which establishes a connection to the alarm upon insertion of the appliance into its compartment or normal operating position in the vehicle and which disestablishes the connection upon removal of the appliance from its compartment. Any suitable power source for the circuit may be utilized, however, in the preferred embodiment of the invention, the prime battery of the vehicle is utilized.

In operation, when the appliance is inserted in its compartment in the vehicle, the alarm will signal until the operator turns the ignition switch on at which time the signal will terminate. Subsequently, when the operator turns the ignition switch off, the signal will again commence telling the operator to remove the appliance from its compartment. The alarm will continue to be energized as long as the ignition switch is off and the appliance is still in its operating position in the compartment. To terminate the signal, the operator must remove the appliance from its compartment. The appliance is then taken out of the automobile by the operator.

The present invention also includes a novel circuit for carrying out the above functions.

DRAWINGS

Other objects and advantages of the present invention will become apparent from the following detailed description taken in conjunction with the drawings in which.

DETAILED DESCRIPTION

Figure 1:
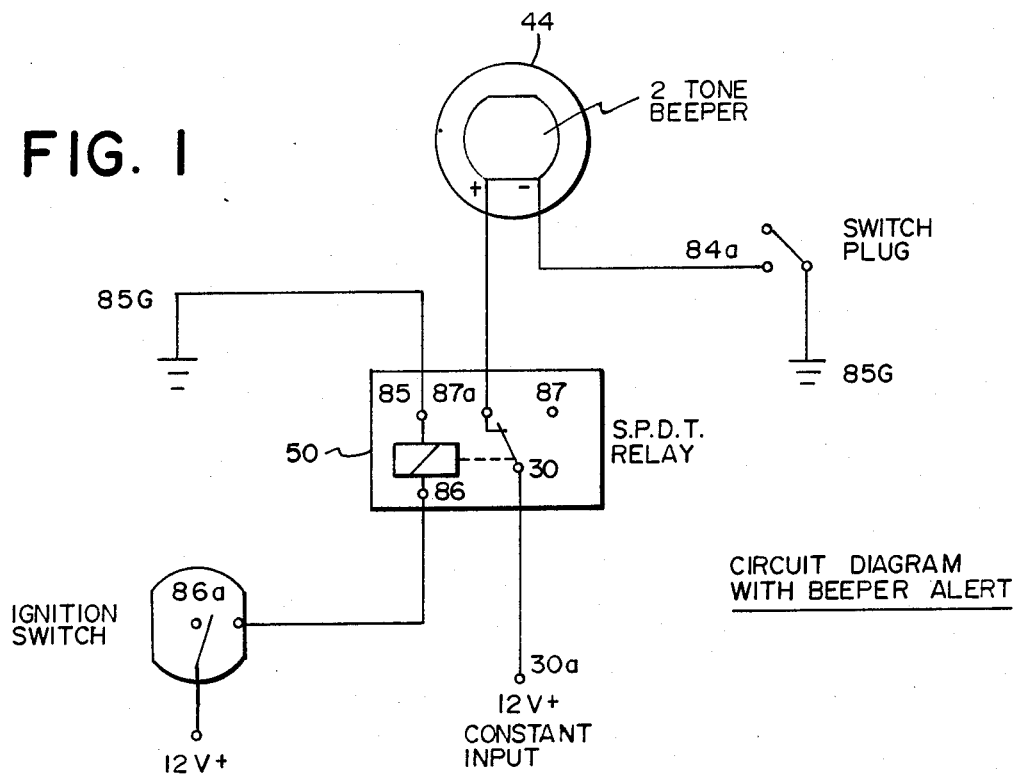
FIG. 1 is a schematic view of an alarm circuit included in one preferred embodiment of the system of the present invention.

Referring now to the drawings in detail and initially to FIG. 1, there is illustrated one preferred embodiment of an alarm system of the present invention including an audible alarm in the form of a two-tone beeper 44 powered by any suitable source, preferably a 12 volt battery 30a of an associated automobile (not shown in FIG. 1). Battery 30a is connected to beeper 44 through a relay (or a transistor) generally designated 50 and preferably a single pole double throw relay having a capacity of up to 5 amps.

In the specific embodiment shown, relay 50 includes terminals 85 and 86 on the coil side, a normally closed terminal 87a and a normally open terminal 87. Terminals 87 and 87a are adapted to be alternately connected to the battery 30a through a contact arm 51 connected to terminal 30 while normally engaging terminal 87a but being movable to engage terminal 87 upon actuation or energization of the relay 50. Energization of the relay is achieved through a switch, preferably the ignition switch 86a of the associated automobile which switch is connected to terminal 86 of the relay. Terminal 85 of the relay is connected to any suitable ground 85G to establish a circuit through terminals 85 and 86 and ignition switch 86a.

Figure 5:
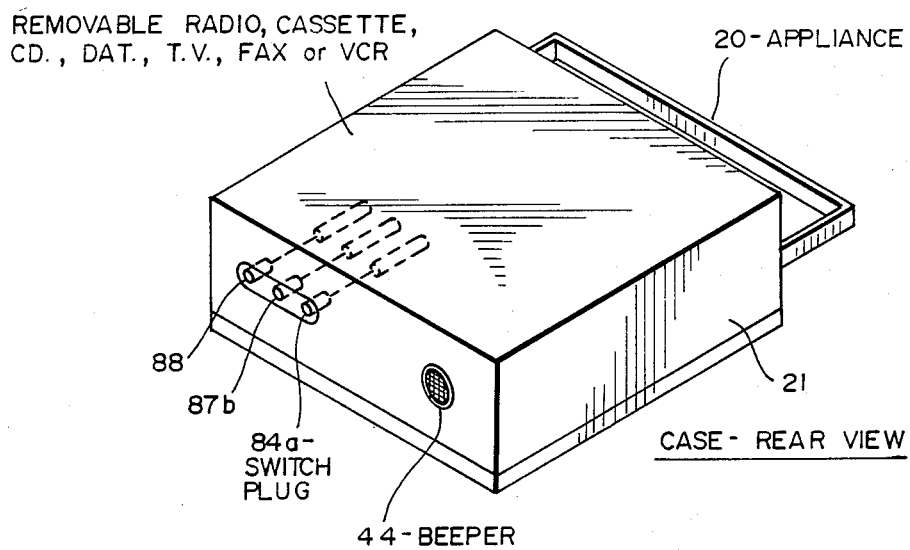
FIG. 5 is a perspective view of an appliance as seen from above the rear end thereof and incorporating portions of a circuit such as those shown in FIGS. 1 through 4.

In order to establish a circuit through the beeper 44 to energize the same, the negative side of the beeper is connected to a switch 84a, one side of which is connected to ground 85G. In accordance with the invention, switch 84a is adapted to be closed through the use of the appliance to be protected when the appliance is placed into a predetermined position such as in its operating compartment or case in the associated automobile and typically in the dashboard panel thereof. In the preferred embodiment, switch 84a is a plug switch including male and female connectors with the latter being housed in the rear end of the appliance 20 as is conventional, such as shown in FIG. 5, such that insertion of the appliance in its compartment will close the switch 84a to connect the beeper to ground 85G. Instead of the plug switch 84a described, other types of switches to be actuated or energized by positioning the appliance 20, may be employed and such switches may include photoelectric switches, or switches actuated mechanically through engagement by the appliance and other switches.

To summarize operation of the alarm system, let it be assumed that the operator enters the automobile and first inserts the appliance 20 into its normal operating compartment while the ignition switch 86a is off. This step will close switch 84a, thus establishing a circuit through 30a, 30, 87a, beeper 44, switch 84a and ground 85G energizing the beeper. When the operator turns the ignition switch 86a on this will energize the relay 50 causing the contact arm 51 to move out of engagement with contact 87a and into engagement with contact 87, thus causing the beeper 44 to stop sounding. The operator may then, of course, commence normal operation of the vehicle and appliance without sound interference from the beeper 44.

When the operator prepares to leave the automobile, he may remove the appliance before he turns the ignition switch 86a off and then turn the ignition switch 86a off and leave the vehicle while taking the appliance with him. However, should the operator first turn the ignition switch 86a off while the appliance 20 is still in its compartment, the beeper 44 will sound to signal to the operator to remove the appliance from its compartment. As soon as the appliance 20 is removed from its compartment, the beeper sound will cease.

Figure 2:
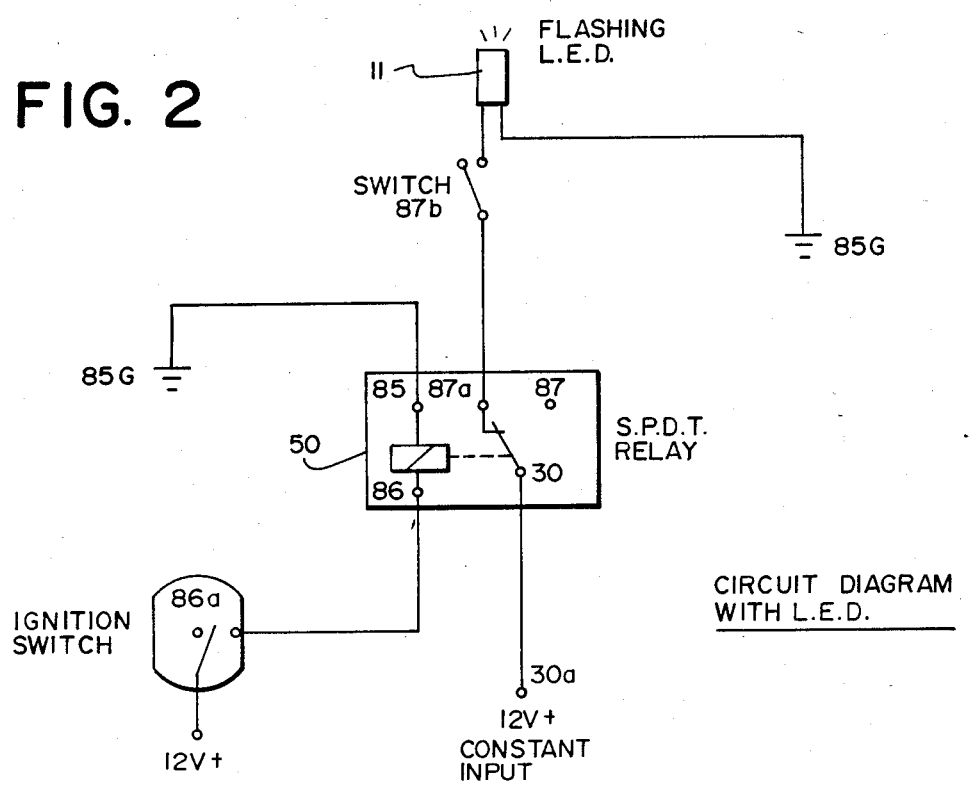
FIGS. 2, 3 and 4 are schematic views of circuits included in three other preferred embodiments of the system of the present invention.

In other embodiments of the invention, a visual alarm may be used in place of an audible alarm. Referring to FIG. 2, there is illustrated another system of the invention which is generally the same as that of FIG. 1 except that a visual alarm or signal in the form of a flashing light emitting diode 11 is employed instead of a beeper. The circuit includes a plug switch 87b which may be formed in the rear of the appliance 20 (see FIG. 5) when the appliance is inserted into its compartment in the vehicle.

Figure 3:
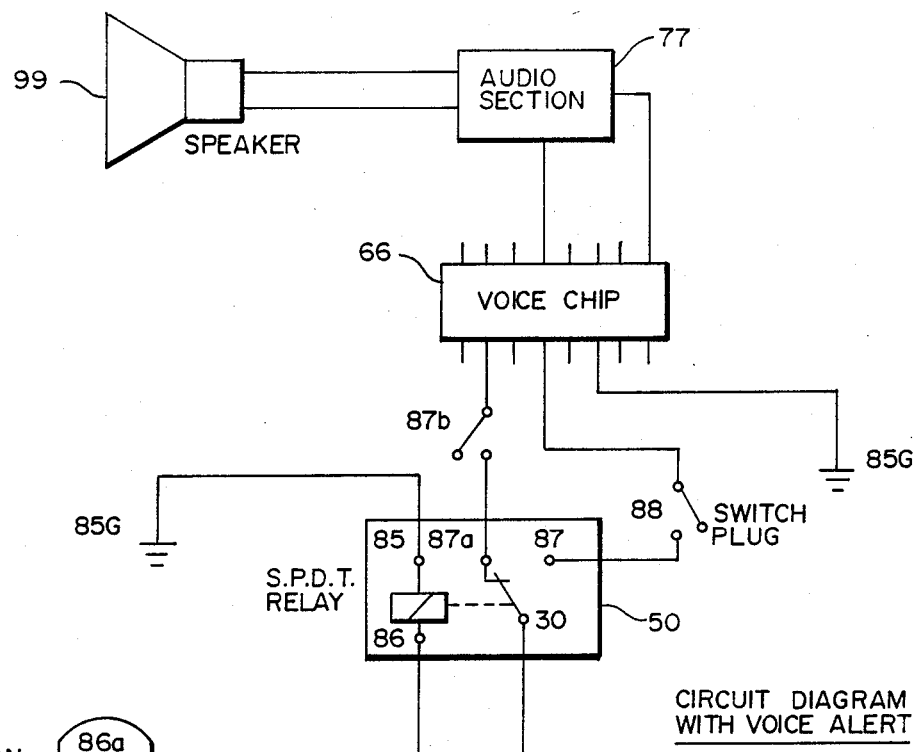

FIG. 3 illustrates another embodiment of the invention wherein the alarm or signal is in the form of a voice produced through a voice chip 66, audio section 77 and a speaker 99 connected in series to be energized when plug switch 87b is closed upon insertion of the appliance when the ignition switch 86a is off.

Figure 4:
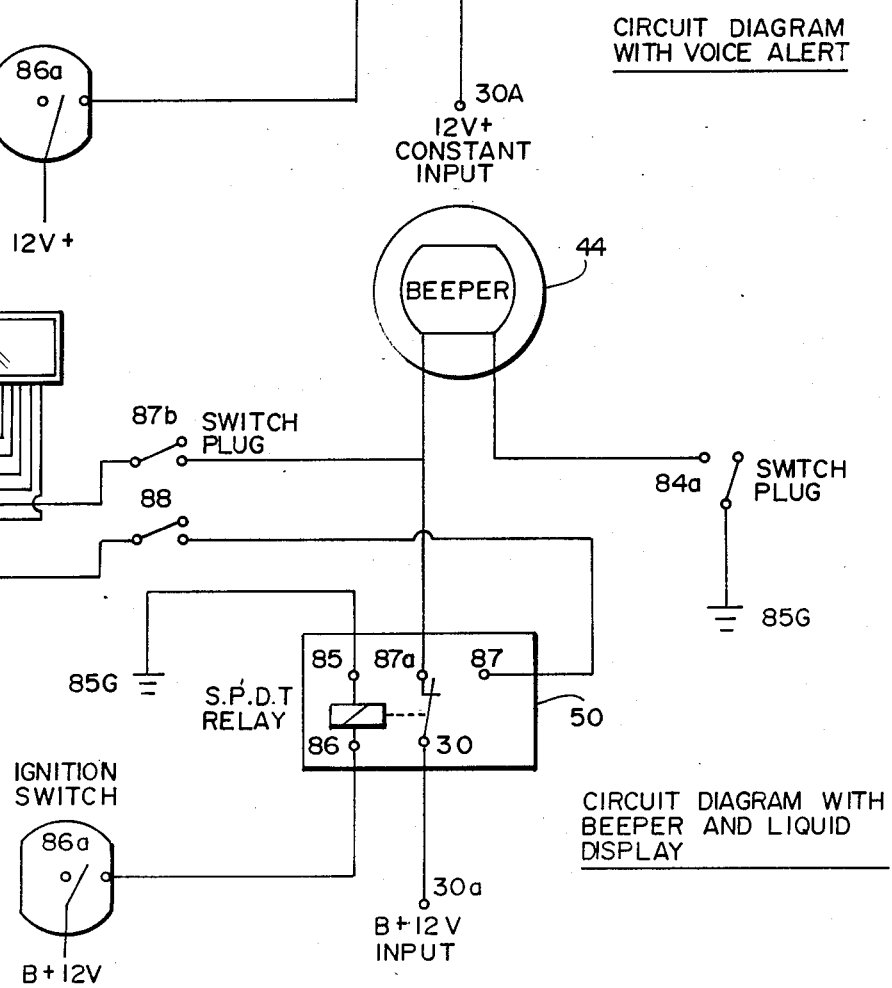
Figure 6:
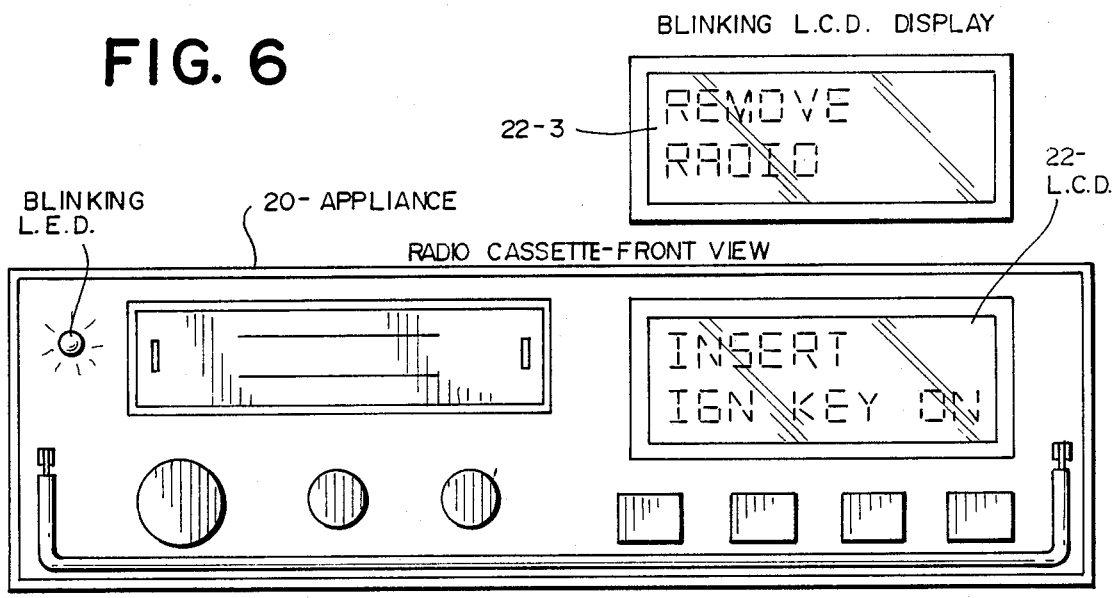
FIG. 6 is a front, fragmental, elevational view of an automobile dash board panel incorporating the system of the present invention.

Referring to FIGS. 4 and 6, another preferred embodiment of the invention is disclosed which incorporates a beeper 44 as well as a visual display 22 giving instructions to the operator to either insert the ignition key on or to remove the appliance (see FIG. 6). In addition to the plug switch 84a utilized to energize the beeper 44 as described above, the present embodiment employs plug switches 87b and 88 to energize the liquid crystal display 22 through control chip 33. In the preferred embodiments, display switches 87b and 88 are formed like beeper switch 84a so that they may be incorporated in the rear end of the appliance as shown in FIG. 5. Display switch 87b is connected to the positive side of the beeper circuit while the other display switch 88 is connected to terminal 87 of the relay.

When the appliance 20 is inserted in its compartment with the ignition switch off, the beeper 44 will sound, and through switch 87b which will be closed, the display will be energized to display the words "INSERT IGN. KEY ON" telling the operator to turn the ignition key on to stop the beeper sound.

When the operator turns the ignition switch on, the relay 50 will be energized to move contact 51 from terminal 87a (opening the circuit to the beeper 44) to terminal 87 closing the circuit to the display through switch 88 which is closed. The chip 33 will program the words "REMOVE RADIO" in its memory while the beeper 44 is deenergized during normal operation of the vehicle.

Should the operator turn the ignition key off while the appliance is still in its compartment, the relay 50 will deenergize moving contact 51 from terminal 87 to terminal 87a. The beeper 44 will then sound while the display 22-3 indicates the words "REMOVE RADIO". When the operator removes the appliance, the beeper 44 will cease sounding and the display 22 will also be deenergized to cease any display.

Although not shown in the drawings, it will be apparent that the voice signal of FIG. 3 may be used in place of or together with the display of FIG. 4.

As used herein, the term "alarm" is meant to be interpreted broadly to include a visual or audible signal including sounds, word displays, voices, lights, etc. Although only one appliance has been shown and described herein as being monitored by the system of the invention, it will be understood the two or more appliances in the same vehicle may be monitored against theft in accordance with the present invention.

It will also be seen that the present invention may be easily applied to conventional appliances such as car radios which typically are provided with female terminals that may be used to form the switches 84a, 87b and 88 of the present invention.

What is claimed is:

1. In an automotive vehicle or the like having an appliance located in a predetermined installed position, said appliance being removable from said installed position, an ignition switch, means for signalling that the appliance is in said predetermined position when the ignition switch is in an off position, and wherein said means includes an alarm and means for energizing the alarm when said ignition switch is in said off position and said appliance is in said predetermined installed position and means for de-energizing said alarm when the appliance is removed from said installed position while the ignition switch is in said off position.

2. In an automotive vehicle or the like as defined in claim 1 wherein said means includes a second switch controlled by the position of said appliance.

3. In an automotive vehicle as defined in claim 2 wherein said alarm produces an audible sound upon energization.

4. In an automotive vehicle as defined in claim 2 wherein said alarm produces a visual display upon energization.

5. In an automotive vehicle as defined in claim 2 wherein said means includes a power source for energizing the alarm, a relay connected between the power source and the alarm, said ignition switch is connected to said relay to control the same and said second switch is connected to said alarm.

6. In an automotive vehicle defined in claim 5 wherein said relay is a single pole double throw relay.

7. In an automotive vehicle defined in claim 5 wherein said second switch is a plug switch including a receptacle in said appliance.

8. In an automotive vehicle as defined in claim 6 wherein said second switch is a plug switch including a receptacle in said appliance.

9. In an automotive vehicle as defined in claim 5 wherein there is further included a battery for powering said vehicle and said power source is said battery.

10. In an automotive vehicle as defined in claim 4 wherein said alarm also produces an audible sound together with a visual display upon energization.

11. An indicating system for indicating that an appliance has been left in an automotive vehicle comprising in combination, indicating means for producing a signal, power means for energizing said indicating means, a relay means connected between said power means and said indicating means to control energization of said indicating means, a first switch means connected to said relay means to control the same, and means for establishing, through installation of an associated appliance at a predetermined position in the vehicle, a circuit through said indicating means for energizing the same when said first switch is in an open position.

12. The indicating system defined in claim 11 wherein said relay means is a single pole double through relay.

13. The indicating system defined in claim 12 wherein said indicating means includes two indicators and said relay includes two terminals respectively connected to the indicators.

14. An indicating system for indicating that an appliance has been left in a predetermined installed position in an automotive vehicle comprising in combination, an indicating means for producing a signal, means for connecting the indicating means to a source of power, means for connecting the indicating means to an ignition switch of an automotive vehicle, and means for energizing said indicating when the ignition switch is in off position while the appliance is in said installed position thereof.

15. The indicating system defined in claim 14 wherein said means for allowing energization of said indicating means includes a connector adapted to be inserted in the associated appliance.

16. The indicating system defined in claim 14 wherein said means for connecting said indicating means to said power source includes a relay adapted to be controlled by a vehicle ignition switch.

17. The indicating system defined in claim 16 wherein said relay is a single pole double throw relay including two terminals, and said indicating means includes two indicators respectively connected to said terminals.

18. A method of indicating that an appliance has been left in a predetermined installed position in an automotive vehicle wherein the appliance is removable from the vehicle, the method comprising the steps of connecting an alarm to the ignition switch of the vehicle and also to a switch to be closed by positioning the appliance in said predetermined installed position such that the alarm will be energized when the ignition switch is turned off with the appliance in said predetermined position and the alarm will be de-energized when the appliance is removed from said installed position.

19. A method of protecting an appliance such as a radio in an automotive vehicle against theft comprising the steps of producing a signal when the ignition switch of the vehicle is turned off while the appliance is still installed in the vehicle, using the installed position of the appliance in the vehicle to energize the signal only as long as the appliance remains in the installed position, and removing the appliance from its installed position to deenergize the signal.

20. A method of protecting against theft an appliance such as a radio installed in an automotive vehicle comprising the step of releasably connecting the appliance to an indicating circuit to produce an alert signal when the ignition switch of the vehicle is turned off while the appliance is installed in the vehicle to alert an operator of the vehicle to remove the appliance from the vehicle.

* * * * *